United States Patent
Korotaev

(10) Patent No.: US 9,477,461 B1
(45) Date of Patent: Oct. 25, 2016

(54) SYSTEMS AND METHODS FOR GENERATING AND APPLYING OPERATING SYSTEM LIVE UPDATES

(71) Applicant: Cloud Linux Zug GmbH, Zug (CH)

(72) Inventor: Kirill Korotaev, Moscow (RU)

(73) Assignee: Cloud Linux Zug GmbH, Zug (CH)

(*) Notice: Subject to any disclaimer, the term of this patent is extended or adjusted under 35 U.S.C. 154(b) by 61 days.

(21) Appl. No.: 14/639,337

(22) Filed: Mar. 5, 2015

Related U.S. Application Data

(60) Provisional application No. 61/951,905, filed on Mar. 12, 2014.

(51) Int. Cl.
*G06F 9/45* (2006.01)
*G06F 9/445* (2006.01)

(52) U.S. Cl.
CPC .. *G06F 8/67* (2013.01); *G06F 8/41* (2013.01)

(58) Field of Classification Search
CPC ............ G06F 8/67; G06F 8/41; G06F 8/433; G06F 8/443
USPC .................................................. 717/146, 151
See application file for complete search history.

(56) References Cited

U.S. PATENT DOCUMENTS

| | | | | |
|---|---|---|---|---|
| 2006/0048117 A1* | 3/2006 | Archambault | .......... | G06F 8/443 717/151 |
| 2007/0240137 A1* | 10/2007 | Archambault | ........ | G06F 8/4442 717/140 |
| 2008/0091697 A1* | 4/2008 | Cui | ...................... | G06F 12/0253 |
| 2014/0164727 A1* | 6/2014 | Susnea | .................. | G06F 12/023 711/170 |

* cited by examiner

*Primary Examiner* — Anna Deng
(74) *Attorney, Agent, or Firm* — Bardmesser Law Group

(57) ABSTRACT

Method for generation of a live update including compiling original source code into a first intermediate representation (IR) code; compiling modified source code into second IR code; analyzing and comparing the first and second IR codes to identify variables and functions that were changed generating a part of final IR code with all the original variables and functions; generating an additional part of final IR code with new code for modified portions of the changed original functions, added functions and variables, and marking it for compilation into special code/data sections; and compiling a new object code and a final executable binary based on the final IR. The final executable object code includes the original code and data from original application binary, and a live update code and data from additional part of final IR generated. The live update code and data refer to original code and data where needed via standard object code relocation information.

7 Claims, 11 Drawing Sheets

| | Original code | New code | Generated code | |
|---|---|---|---|---|
| 1 | .globl ptrace | .globl ptrace | .globl ptrace | 1 |
| 2 | .type ptrace, @function | .type ptrace, @function | .type ptrace, @function | 2 |
| 3 | ptrace: | ptrace: | ptrace: | 3 |
| 4 | pushq %rbp | pushq %rbp | pushq %rbp | 4 |
| 5 | ... | ... | ... | 5 |
| 6 | .L417: | .L511: | .L417: | 6 |
| 7 | xorl %rax,%rax | movl $1, %rax | orig_code_start: | 7 |
| 8 | .L418: | .L512: | xorl %rax,%rax | 8 |
| 9 | call func1 | call func1 | .L418: | 9 |
| 10 | test %rax,%rax | test %rax,%rax | call func1 | 10 |
| 11 | jnz .L418 | jz .L512 | test %rax,%rax | 11 |
| 12 | jmp .L417 | jmp .L511 | jnz .L418 | 12 |
| 13 | ... | ... | orig_code_end: | 13 |
| 14 | .size ptrace, .- ptrace | .size ptrace, .- ptrace | jmp .L417 | 14 |
| 15 | | | ... | 15 |
| 16 | | | .size ptrace, .- ptrace | 16 |
| 17 | | | | 17 |
| 18 | | | .section .kpatch.text | 18 |
| 19 | | | kpatch_start: | 19 |
| 20 | | | .L511.kpatch: | 20 |
| 21 | | | movl $1, %rax | 21 |
| 22 | | | .L512.kpatch: | 22 |
| 23 | | | call func1 | 23 |
| 24 | | | test %rax,%rax | 24 |
| 25 | | | jz .L512.kpatch | 25 |
| 26 | | | jmp orig_code_end | 26 |
| 27 | | | kpatch_end: | 27 |
| 28 | | | | 28 |
| 29 | | | .section .kpatch.info | 29 |
| 30 | | | .quad orig_code_start | 30 |
| 31 | | | .quad orig_code_end | 31 |
| 32 | | | .quad kpatch_start | 32 |
| | | | .quad kpatch_end | |
| | | | .string "ptrace.kpatch" | |

FIG. 3

SYSTEMS AND METHODS FOR GENERATING AND APPLYING OPERATING SYSTEM LIVE UPDATES

CROSS-REFERENCE TO RELATED APPLICATIONS

This application is a non-provisional of U.S. Provisional Patent Application No. 61/951,905, filed on Mar. 12, 2014, which is incorporated by reference herein.

BACKGROUND OF THE INVENTION

1. Field of the Invention

The present invention relates to live updates of operating system code.

2. Background of the Related Art

Whenever a software system gets a functionality or security fix, users running the software may need to update it by downloading and applying the fix to that software. However, for most types of software, especially one distributed in a form of binary code, this typically requires a software restart and leads to an undesirable disruption. A good example of such undesirable disruption is Operating System (OS) kernel updates, which require the entire host machine and all its running applications to reboot, which may result in tens of minutes of effective service downtime.

A "live update" technology changes a running program or those of its parts that require the update without restarting it. However, it is a challenging task to generate and apply such binary updates for programs written in languages like C/C++ and then distributed as compiled machine-dependent binaries.

SUMMARY OF THE INVENTION

The present invention relates to hot updates of the OS that substantially obviates one or several of the disadvantages of the related art.

It is quite common that many system administrators and service providers (SPs) do not update their Operating System every time an OS vendor issues an update, in order to avoid downtime. While application updates typically lead to small downtime, on the order of seconds, kernel and complex application updates require a host reboot to take into effect, and may be as long as minutes, and then requiring tens of minutes to cache the data back, which is needed for normal functioning right after the reboot. It is also not easy to plan downtime for thousands of systems and its users, perform an instantaneous update on all of them, and then to verify that updates were successful, and the systems are up and running again. All this leads to a situation when it is fairly easy to find nodes with years of uptime among many SPs, and these nodes are vulnerable to multiple security issues patched by the OS vendor during that time. Therefore, it is important to be able to keep an OS kernel and the rest of the software components and applications running secure and yet to avoid the downtime needed for conventional updates with reboot.

For translated programs, like those written in PHP, it is quite easy to update just by installing new sources and making the translator note these new sources. With binary programs, including OS kernels, it is much harder to update, and there are multiple challenges as to how to prepare such an update, and then later how to apply it safely. The brief list of challenges includes a way to "extract" changed code from the binary, making sure the patch code is correctly linked with the rest of the original code, determining a point in time when a patch can be applied (i.e., replace the original code in memory), determining whether changes in data structure declarations and content are safe and will not affect the stability after the patch is applied, and so on.

Embodiments of the invention include techniques for preparing live binary updates to an object (binary or machine) code based on the original and a modified source code (which is, for example, C/C++, but can be other higher level languages that are compilable to machine code) and addressing the challenges described briefly above and in more detail below. By "original source code", we mean the source code used to build a running application and to be live-updated later. Modified source code corresponds to the original application source code with an applied patch fixing some issue(s) (and thus it is a "modified original source code"). Both source code trees can be used to generate (compile to) the original application binary code and the modified one accordingly.

"Binary code" and "object code" terms refer to the same machine-specific executable binaries (as a whole or as a part or library linked to the other binary), and can be used interchangeably.

For example, an original source code can be a source code of some specific Linux kernel version (like kernel-2.6.32-358.0.1.e16) and the modified source code is an updated kernel version source code (like kernel-2.6.32-358.23.2.e16 with security fixes applied). The binary code corresponds to these kernel binaries, which is stored in Linux kernel case in decompressed vmlinuz or vmlinux files and kernel modules. The discussion herein may frequently refer to Linux kernel for specific examples and details without losing generality, and the same methods can be applied to other types of applications or systems (such as other OS kernels and their modules, Linux kernel modules, user-space applications and libraries, etc.).

Embodiments of the present invention include methods and a system for how to prepare a live update binary patch for the running application by finding the application changes on an intermediate code level, such as compiler generated assembler code or a so-called intermediate representation (IR) level, sometimes called intermediate language (IL). Such a level of analysis and update generation is much easier than other approaches working on the binary level, is almost platform-independent, is safer and allows replacing arbitrary small pieces of code with their new versions.

Another even simpler approach would be matching all existing application functions to the same functions in a new binary version and redirecting all old functions to the new ones.

In one embodiment, a description of possible techniques for code update applied safely is provided. The proposed methods allow to modify the running code in memory, without a risk to race with the CPU during code execution and thus disrupting normal execution, which would lead to a malfunction. To do so, a system should freeze the normal execution by collecting all the execution threads at some safe execution call trace, which would guarantee that none of the functions on the trace will ever be modified by the live update, and thus the update will not disrupt the execution of these functions. Another part of the embodiment also describes a way of "extending" existing data structures of used objects (before the live update) in memory, by adding to them additional data elements stored somewhere else and looking them up by means of a pointer stored in the original data structure itself or in unused pieces of memory allocator data structures.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings:

FIG. 3 illustrates an example of two IR codes (in assembler) corresponding to the original and modified programs and a resulting intermediate language code, with both original and modified codes combined together, and additional information describing these changes that would allow later to apply the binary update.

DETAILED DESCRIPTION OF EMBODIMENTS THE INVENTION

Figure 1:
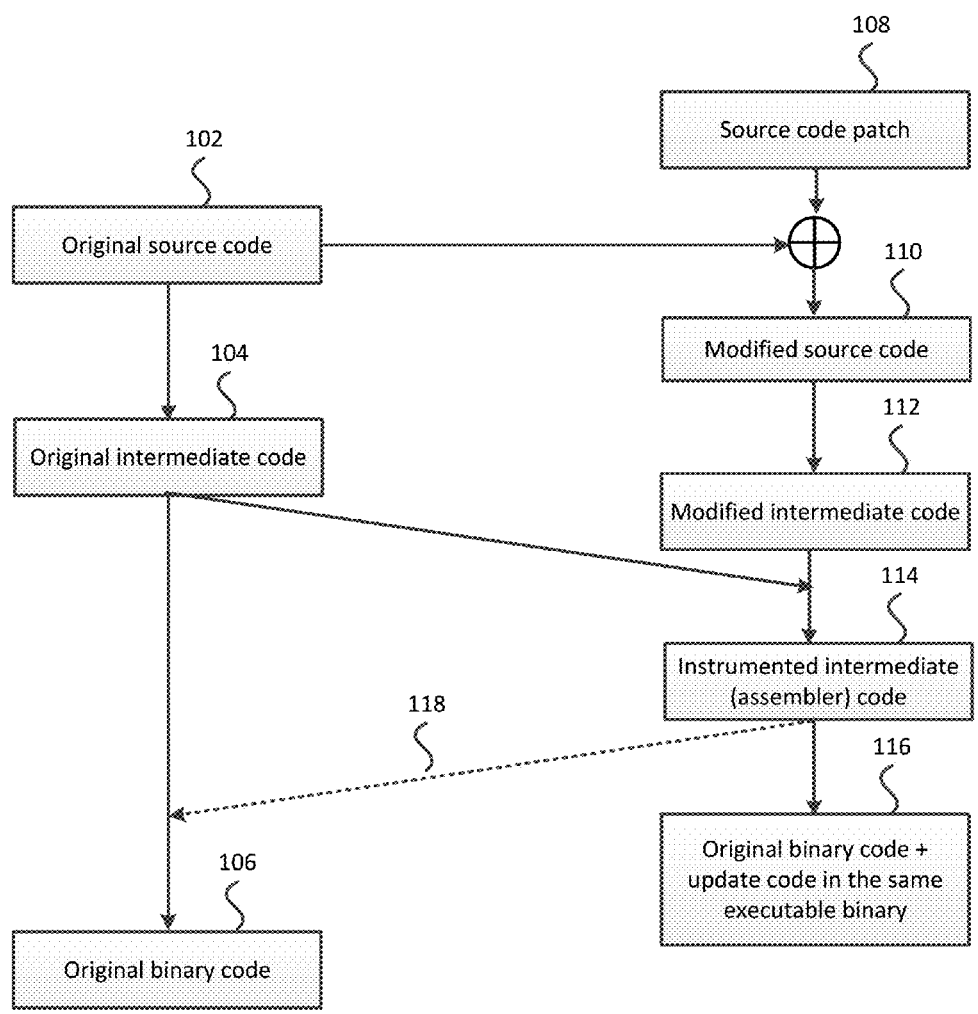
FIG. 1 illustrates an overall process of creating live update binaries from an original and a modified source codes.

Reference will now be made in detail to the preferred embodiments of the present invention, examples of which are illustrated in the accompanying drawings.

Embodiments of the invention include techniques for preparing live updates that can be used to address multiple challenges of applying updates to software applications and operating systems without a restart.

A number of challenges exist for any live binary program update system:

One challenge is understanding how user changes affect the program binary. While software engineers write programs in human-readable languages, like C/C++, computer programs are often distributed and executed in a platform-dependent binary form, executable by a particular CPU (e.g., ELF x86-64 files on Linux platform). When such a human readable program is compiled into binary object code, there is no easy way to predict what will change in the binary and generate the binary change just by looking into the source code change (patch). For example, a simple change of a single code line can easily make compiler to reorder the code and functions, inline some functions, which were not previously inlined (or vice versa) and so on. So a typical binary update system generates code updates from the binaries. Problems of such approach are briefly covered below.

A second challenge has to do with code units for the update. Binary code consists of instruction blocks, and these code blocks are linked together using CPU jump instructions (conditional or unconditional). Whenever an original code is patched, an unpredictable set of code blocks and their sizes is changed by the compiler in the resulting binary. So it is critically important for an update system to replace code blocks in such a way that links between original and a new ones remain still valid, and the execution will not go into the middle of the instruction of a new or old block. This is an especially a complicated task, since blocks may refer to each other using absolute or relative jumps, and code addresses may be stored somewhere in the existing data structures already. For this reason, typical patch system can replace functions as a whole only, and require either special information about all such "function" blocks from the compiler (like GCC-function-sections option) or require special code instrumentation to be built into the beginning of the function to be patched (e.g., by using GCC-pg option).

A third challenge has to do with the fact that binary code changes as soon as code layout is slightly changed. Binary code blocks may refer to each other, so as soon as some code layout is changed, almost all the code blocks will be affected in a binary due to changed constant addresses (or relative offsets) used for the reference. The best example of this effect is a relative call instruction, which changes as soon as code between caller and callee changes its size. So if a binary update system were to try to match these changes in the old and new binaries, it would realize that code blocks have not really changed. This may require both additional information from the compiler like relocation information on every such spot in the binary or disassembling of the binary to try to understand the source of the difference in the location, and whether it is an equivalent code or not.

A fourth challenge has to do with the fact that an update to the source code may change non-relevant binary pieces. Binary code can often depend on the placement of the function in the source code due to use of context-dependent macros, like _func_ or _LINE_, which expand to the name of the function and code line number. So adding a source code line in one place can easily result in a change of some functions in another place (typically below in source code file) and its separate code blocks in the binary, which were not related to the update and logically have not changed at all. The best example of this effect is a BUG_ON( ) macro in Linux kernel, which depends on the source code line number where it is placed and changes its generated code if it is moved just 1 line below. To avoid updating such not-really-changed code blocks and functions, one has to perform complicated binary code analysis (disassembly), to make sure the original and modified binary code blocks match, except for minor differences such as those mentioned above.

A fifth challenge has to do with the fact that existing data structures require modification and extending. Almost any more or less complex application stores its data structures in memory. The source code patch may want to change the data structure, both by changing the meaning of the data and by removing/adding some data elements from/to the data structure. Since a live update is applied to the running application, all the existing instances of the data structure in the memory must be converted accordingly, before the new code will ever get executed. This is not always possible, since there may be no room for adding the new elements into these memory data structure instances.

A sixth challenge relates to safety detection of data modifications. A robust live update build system should be able to determine automatically whenever a potentially unsafe modification of the data structure is made.

A seventh challenge relates to safe code update without disruption of the current CPU execution path. During program execution, the CPU can go into multiple and deeper calls of different functions, which is called a call trace. During live update, it must be guaranteed that execution of application threads, which are inside that function from the call trace list, must not be affected. Consequences of such changes can easily be data corruption and crashes, since the CPU would keep executing the old code for an arbitrary time, which might no longer work correctly with the data structures. Even worse, the CPU might try to execute the part of the instruction that is updated right at the moment by live update installation, and thus execute the wrong set of instructions.

An eighth challenge relates to live update code relocation. Since live update code is loaded at some random memory addresses allocated for it by the OS, and the original code is already running at some other addresses which may not be fixed as well, it is obvious that a new code must be linked somehow into the running one. Typically such a process of linking two code pieces together is called "code relocation". Update code may require absolute addresses to be inserted in places where address of either the application or update itself is used, or relative offset adjustments when update refers to the original application by an offset relative to itself (e.g., in jump/call instructions). An additional complexity for the live update system are updates to "modules" for the application, like Linux kernel modules, which can be loaded later and require different types of relocation when module refers to the original code, the module itself or new code in a main module update code.

Input to the live update system includes original and modified source code. Original binary code can be used for additional verification of correctness of an update build process and its repeatability, but is not strictly needed during the process of update preparing, as it can be reproduced from the original source code by compiling it. Both binary codes corresponding to the original and modified source code, and the binary code obtained during the compilation process can be used during the process of live update preparation.

Being able to repeat the build process and reproduce the same binary is critical, since it guarantees byte-to-byte matching of the binary code to the one originally used, as well as correctness of the relative memory and code addressing used all over the code. The original binary may, however, be dependent on some external state like a time stamp at the moment of the build, domain name of the host where it was built, compiler version, build path and so on, by including this data in the build. So to reproduce the binary, it might be required to reproduce these parameters, and supply the fake date/time to the compiler, to make sure that this information in binaries will match. Linux kernels already have some of the means for making reproducible binaries, like ability to define build number via KBUILD_BUILD_VERSION environment variable. However, some tricks are still needed during the compilation stages to make binaries reproducible, like redefining standard C macros like _DATE_, _TIME_, etc.

One way a live update system could produce a live update would be to perform an analysis and comparison of original and modified binaries. This however, has some challenges, as outlined above and requires significant efforts for verification of the resulting binary patch. Instead, a method and a system are proposed to perform code analysis and comparison on an intermediate code compilation stage—when the internal compiler intermediate representation (IR) for the program has been built and optimized out, or machine specific assembler code was generated out of the IR. The former approach requires compiler modification, or support from the compiler to read the intermediate compilation state (IR) in such a compiler-specific language, and load it back after it is processed and modified by the update system. For that reason (and for the sake of easier demonstration of the concept) the rest of the description describes an analysis and comparison to be done using an assembler language output of the compiler. Using an assembler language as an intermediate language (representation) is also natural, since all compilers go through this stage and are able to compile into assembler and then to the object code, rather than directly to the object code.

Nevertheless, the same methods as described above can be applied to representations of a program, such as IR or a byte code used in some platform-independent application platforms (like Java). If there were a support for the methods described from the compiler, the process of the live update generation would be even more efficient, as described below. The LLVM compiler, for example, has 3 types of IR, with assembler being one of them: "The LLVM code representation is designed to be used in three different forms: as an in-memory compiler IR, as an on-disk bitcode representation (suitable for fast loading by a Just-In-Time compiler), and as a human readable assembly language representation. This allows LLVM to provide a powerful intermediate representation for efficient compiler transformations and analysis, while providing a natural means to debug and visualize the transformations. The three different forms of LLVM are all equivalent." See http:**llvm.org/docs/LangRef.html. So it should be straightforward to implement the concept using the compiler in-memory IR, rather than assembler output.

Code comparison on intermediate compilation phases has dramatic advantages over comparing two binaries of having full information about all program symbol names (local and global), all code blocks (functions and parts of them), basic blocks (a term used in compilers for a piece of code without jumps), their relations and links, execution paths, and so on. For example a reference to some symbol can be a constant in the binary, and at the same time a named unambiguous reference in the intermediate representation. Another such example would be a mix of code and data, which is used in some programs (like older versions of the Linux kernel), that would potentially prevent a safe and reliable disassembly of the code in case of needed code analysis. The same code analysis process on the intermediate compilation stages has an easy and elegant access to the information about the program structure that is later lost during final compilation stages.

FIG. 1 illustrates an overall process of generating a live update binary (116) for the software using this technique. The modified source code (110) is typically produced from the original source code (102) and a patch (108), which should be applied to it. A software build system is modified to make a compilation go through via intermediate stage, rather than directly to object code. The original intermediate IR code (assembler) (104) can be further compiled into a final binary to self-verify the process, and make sure the original code (106) running on systems is reproduced. An analysis and comparison of the original (104) and the modified intermediate (assembler) code (112) results in a generating of the new, "Instrumented" intermediate (assembler) code (114).

This instrumented intermediate (assembler) code (114) is constructed in such a way that, if compiled, it produces the resulting file with the original binary code and a code for the update in the very same file, including the information about which original code blocks should be replaced with new ones. The resulting file is a conventional object file, like a Linux ELF file or some other platform-specific object file, with relocations information and sections. All the update information is put into an update-specific code and data sections, and can be easily stripped (dropped) and the clean original binary code can be obtained again (see dotted line (118) in FIG. 1).

The advantage of this approach is that the whole process is easy to verify (e.g., original code should match the expected code) and the resulting new patch code resides in the same file and has all the references to the original code and variables in that object file. So, a conventional compiler and linker do most of the job by keeping consistent all the information about references between old and a new code. On the other hand the original binary code can be stripped from the resulting object file using conventional tools, like strip or objcopy, and the live update binary having the new code blocks and information about them generated.

Figure 2:
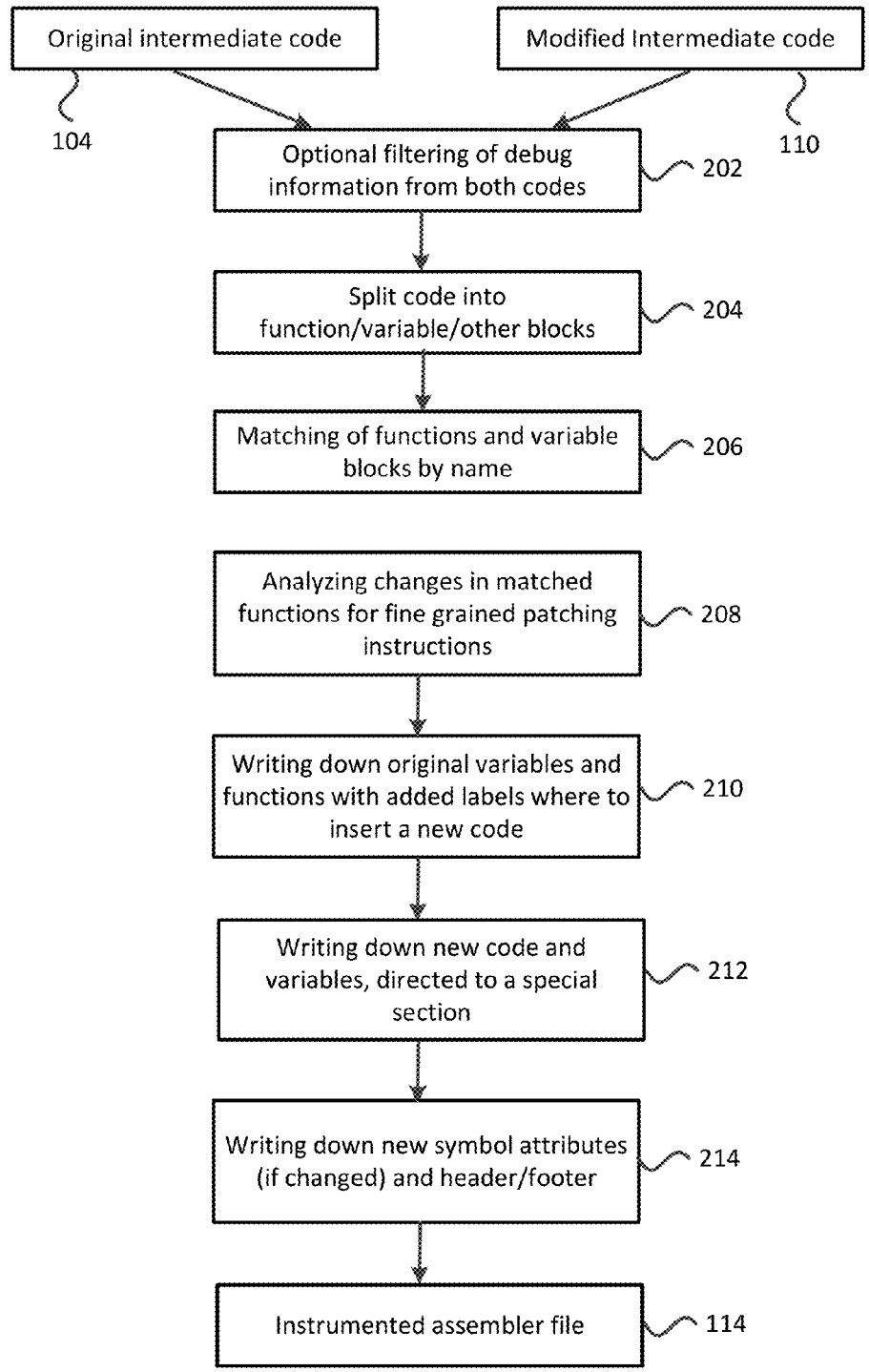
FIG. 2 illustrates details of the intermediate language corresponding to the original and modified code analysis and comparison, which results in generation of a new instrumented program in an intermediate representation (IR) with both original and new code and information about code pieces to replace with the new code.

The process of making an instrumented assembler code generated from the original and modified assembler code is illustrated in greater detail in FIG. 2. Original assembler (IR) code (104) generated by a compiler may contain a lot of debug information and may optionally be filtered (202) to remove that, since it contains the variable data that often contains information like source build path or source code line numbers, which has no practical effect on the binary code generated but makes comparison and analysis harder. For the ease of assembler code comparison, it can be omitted. Analysis and comparison of the raw IR directly in the compiler does not have this problem, since it is easy to analyze only those aspects of IR that are of interest, and ignore the debug information in IR data structures.

In the next step analyzer splits the assembler code into code blocks, like file header and footer, functions, and variable blocks (204), etc. These blocks correspond to high-level language functions and variables, but are highly post-processed by the compiler and have only simple constants or references to other blocks (e.g., C++_LINE_ macro will be replaced by an exact number). Again, this stage might not be needed if analysis is performed right in the compiler and/or over its program IR, which should have all such information inside, in a tree-like form and thus there is no need to reconstruct it. Nevertheless it is not difficult to recover code functions and variables code blocks right from the assembler language generated by modern compilers, as they follow specific fixed rules of code generation and thus, for example for GCC compiler, every function is started with ".type function_name, @function" directive and is ended with a corresponding ".size function_name" directive.

Further analysis includes matching all the variables and functions in the original and modified assembler code using their symbol names (206). This process is not always that trivial, since the compiler might reorder some function and variable blocks, and (which is worse) it may use unique auto-generated names for static variables. In the latter case, content of such auto-named variables is used to verify that the found match is the correct one. For the sake of safety, modification of the variables can be prohibited, since existing variables cannot be changed live safely when the application is running, and transformation of variables state might be needed, so it should be handled differently during live updates. To make such changes, it would be required to prepare special live update initialization code, making the changes to the existing variables state safely.

During variable matching, additional processing can be done to match variables, like those referencing the code line number (_LINE_) and used in some debug macros in Linux kernel like pr_debug( ). Such processing, though not strictly needed, helps to generate smaller patch sizes, since the function code does not really change, though it starts to reference a slightly different static variable with different code line number embedded and we can assume it is the same function and static variable and avoid updating the function. Analysis of raw IR, rather than assembler, would help to do such kind of optimizations fully safely and simply, since it would allow to verify the data structure type and its origin from exact source code line or macro.

After functions were matched in the original and modified assembler codes, further analysis is done to identify exact fine grained pieces of the code that have changed (208). Working in an intermediate language, such as assembler. rather than binary code, helps at this stage, since it is easy to analyze what basic code blocks function consists of, match the labels generated by the compiler in the functions and determine execution paths (jumps) inside the function. A basic block is a simple code block without branch indirection/jumps is meant here. Whenever a piece of code spanning multiple basic code blocks should be replaced by live update, the labels belonging to that range should be renamed to new unique names in the final code to avoid conflicts with the original labels. Such label renaming is demonstrated in a later example.

After all the differences are detected, the resulting assembler code is generated as follows. Non-modified original functions and variables are written down in IR form exactly as they were to make sure original code would be generated if compiled (210). New variables and functions are written out with an attribute to be compiled to the special section (212). By "section" we mean modern executable file formats section support, which allows to group pieces of code and data on the linkage stage as needed (e.g., .text, .data, .bss sections in ELF format). For modified functions the original version of code is also written down as it was, but additionally fine grained pieces of code blocks changed are generated to that special section together with the accompanying information describing the pieces and where they should be applied on top of the original code. These new code blocks may even be inlined in the original assembler code for better comprehension, since they do not affect the original function object binary code due to being compiled to their own code section.

Information describing the changes is also generated, and includes original code block to be updated label (i.e., its start address), size of the original code block to be updated and address of the new code block, its size and code block name. The latter information is helpful for debugging and needed for human readable call traces after system crashes (e.g., Linux Oops dumps). Finally when all the functions and variables are processed like that, system may also write down variable and function attribute changes, which includes changing the scope of visibility (global/local/weak etc.) (214). Every assembler file is terminated then with a standard footer, which is normally the same for both original, and modified assembler input code.

The table in FIG. 3 shows a side by side comparison of the input assembler codes corresponding to the original and modified source codes and the result of the live update generation system which is an output assembler code as well. The latter was generated by the live update system and considered for example herein only. A small portion of the function "ptrace" has changed in lines 7 and 11 (compare left column and center column). Lines 6 and 8 and 12 are changed semantically, but not in their meaning, since labels match to the same positions in code. So assuming that live update system considers lines 7-11 to be updated with the new code from similar lines 7-11 of the modified assembler code, the resulting generated assembler code can look like the one in the last column.

If compiled using an x86_64 GNU assembler, the code will generate exactly the original code in .text code section as the one found in the original object files. The code to be replaced with goes to section called .kpatch.text, and the variables describing the changes go to .kpatch.info section. Both can be extracted by conventional tools, such as objcopy, later. It is worth noting that labels .L511 and .L512 of the modified assembler code were renamed to avoid possible conflicts with the original code ones. Additionally labels orig_code_start and orig_code_end were inserted into original code to refer to the code to be updated.

As mentioned above, lines 6, 8 and 12 are changed in the example semantically, but their meaning is unchanged, since labels match to the same positions in code. It is quite easy for the update generation system to do such matching of labels when functions look almost the same, as in the example given (e.g., just by scanning lines one by one and remembering the renames). For more complicated code changes, the live update generating system can use algorithms like the one used in "diff" tool, to find the matching pieces of code and labels surrounding them, and, as a result, narrowing down pieces of code that do not match and require an update.

Finding the most optimal (smallest) set of changes in the function code is, however, an NP-problem (see http:**en-.wikipedia.org/wiki/NP (complexity)) and may require too much effort which is not worth it, since it is always possible to "grab" a bigger piece of code to be replaced with the new one, up to the whole function in question. For a single or a small number of instructions changed, it may also be desirable to "grab" a bigger code block for the replacement in live update as small code blocks may not have enough bytes to make a replacement to be high performance. For example, in the x86_64 architecture, 5 bytes are required, at least, to insert a jump instruction to the update code in the original binary code, so smaller code blocks would require tricks, like use of int3 1-byte instruction triggering CPU exception and having a high performance overhead.

Compared to binary code analysis the method described above, makes analysis quite simple. Comparing function code is very straightforward, and performed line-by-line, assuming the labels that surround the same code match and can be renamed to old (original) names in the final code. Then, having a map of label names in the original and modified assembler code, it is very easy to replace references to the original code from the modified (new) one with their corresponding old names, while leaving non-matched label references (i.e., those to variables/labels existing in the new code only) with new names. There is no doubt in such matching as it is done by name rather than by using constants. There is no conflicts/duplicates in names, which can occur in binary code analysis, since multiple compilation units each may have their own local symbol with identical names and we process compilation units one by one.

Figure 4:
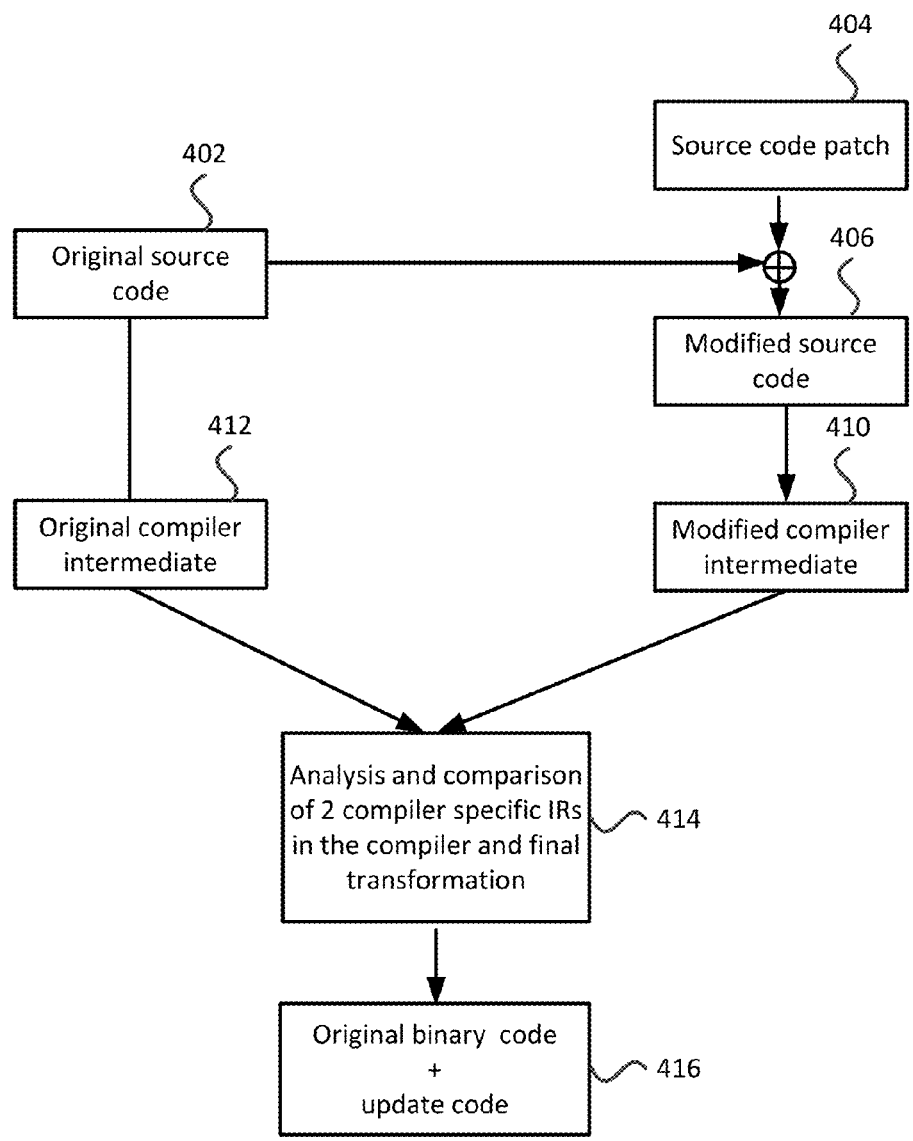
FIG. 4 illustrates an overall process of creating live update binaries from the input original and modified source codes, when implemented in the compiler and the analysis of two IR codes corresponding to these two programs is done in compiler.

The same kind of an original and modified code analysis and live update code generation is even easier to perform within the compiler itself or tools aware of the IR internals. The process may look slightly different in this case from the one described previously, like the one illustrated in FIG. 4. During the build process both the original code and the modified source code (406), using the patch (404) can be compiled into compiler IR (410) and used as an input by the same compiler or related tools to make further analysis (414) of the original compiler IR (412) and the modified compiler IR (410) to generate the original code and an update (416) using the same techniques as described previously. Even more user friendly would be to give both input source codes on the input to the compiler, and the compiler would do IR generation for both of them internally, with further generating the output similar to the one described in FIG. 3 without revealing IR to the user. In a method like that, the compiler can strip (omit) the original code at all and generate only update code with correct references to the original code, which can be used later to link the running original code and the update code together during the update application stage.

Another embodiment of the invention is a way to generate a final binary update from the resulting object code generated previously and including the original and new code for the update. as illustrated in FIG. 3. One possibility would be to preserve relocation information in the object file while stripping the original code out of the resulted file. Later, it would be possible potentially to use such an object code to load into the program and resolve symbol dependencies using standard code linkage mechanisms (possibly with some tweaks), which link back the original and the update code together. This approach may not work well however, unless the compiler generates relocation information for every symbol reference even local ones.

Figure 5:
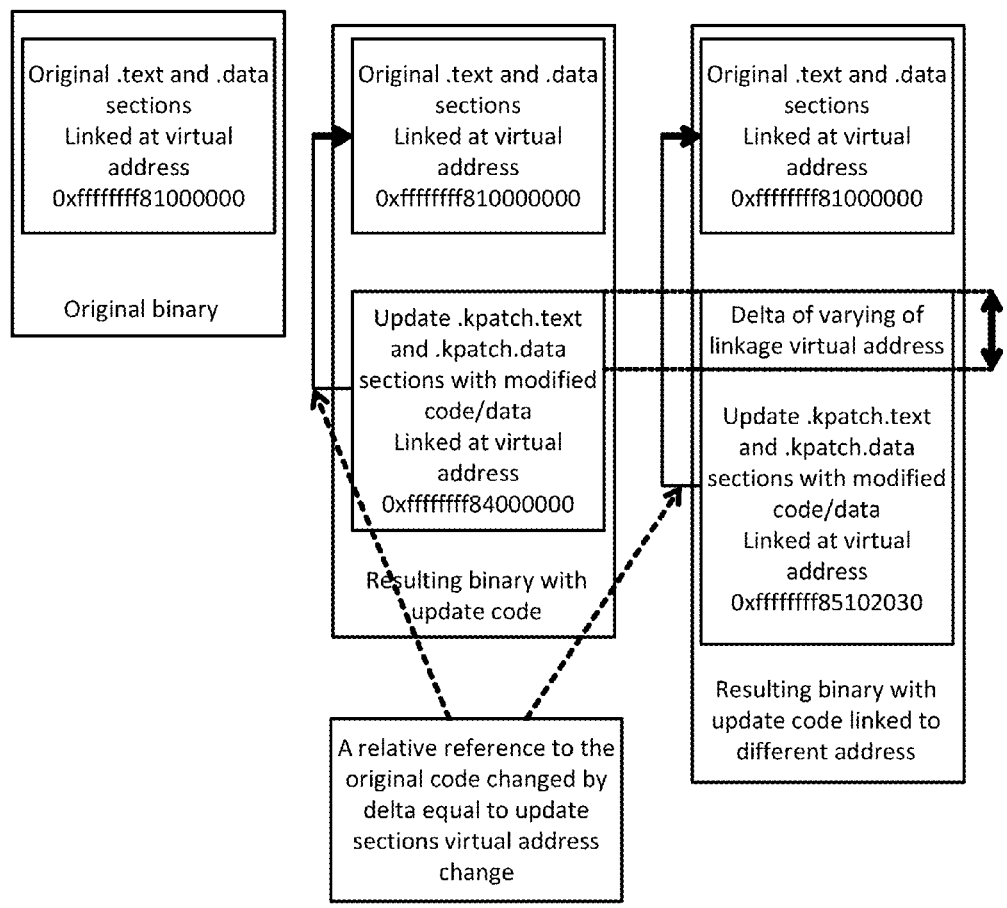
FIG. 5 illustrates a method for extracting relocation information from an object code file by using a linker script doing linking the code versus two different virtual addresses, and then finding a difference in the resulting binaries.

Another approach can be used to generate the required relocation information based on the resulting object code file having both the original and update codes. To do that we "bind" the original code on the linkage stage to some fixed address using linker scripts (like vmlinux.lds used in Linux kernel), as illustrated on FIG. 5, while varying update code address to two slightly different addresses and generate two update stripped binary codes out of such linked files by removing original code out of them (e.g. by using command similar to "objcopy -O binary -j .kpatch.text patch-object-elf-code patch-binary". The resulting two versions of the update code have differences right in the places of references to the original code and itself. For absolute references to the original code, there will be no changes in update code as address of the original code doesn't change in linker scripts for those 2 runs. For the relative references to the original code, such a spot in update code will have a negative change equal to varied address difference (assuming the 1st binary had address smaller than the $2^{nd}$ one for update sections used). Similarly, for relative references inside update code, there will be no changes (since the update code is only virtually moved, with relative addresses not changed), while for absolute references to the update code itself the difference will be positive, since update code address was made larger. Thus, a list of references with their types (relative or absolute, program or update itself) can be built and later used on the update load stage to link the update code with the main running program code.

A similar trick with addresses variation can be used to find code references in the application libraries and modules (like Linux kernel modules). But now the live update code in the modules can refer to all the three binary codes—running (old and original) application code, new (modified) application code in the update, or to itself. To determine these types of references and distinguish them in the procedure above, the virtual link addresses should be varied simultaneously both for application update code, and module update code and these linking address deltas should be selected in a way that it would be possible to distinguish references to the application from the references to its update, i.e., they should not be multipliers one of another.

An alternative approach is to use standard executable binary formats relocation information (e.g., from ELF binaries) and resolve the relocations based on the symbol name references in such relocations during the live update load stages. Such dynamic relocation based on names is a more traditional approach, however, it still requires some caution, since live updates may refer both to local static symbols and global ones with the same names. Thus, any such symbol ambiguity needs to be resolved. Also since the original ELF header is not present in memory for already loaded and running Linux kernel modules, it is required to either put all information about ELF section of the original kernel module into binary patch, or to convert all section-based relocations to symbol-based relocations during binary patch generation procedure.

When the binary for the live update is prepared, it can be loaded into the application.

To do so a kernel module for Linux kernel or Operating System API (such as the Linux debug ptrace API) for user-space applications can be used to load the live update into the running system. To apply the update after loading, it might be necessary to access some non-exported functions (private and not publicly listed in any kind of symbol information except possibly for debug symbols only), and unprotecting the code for modification or allocating memory suitable for running new code. Each update binary may contain the information about these function addresses, specific to that particular application or kernel, in a form of absolute or relative addresses (so that the module could access them) or, even better, might contain the code already linked with the kernel in a position-independent way for applying these update changes and calling all the private symbols internally by their absolute addresses.

To apply the update on the running application, some precautions should be taken to make sure that none of the threads are in the call traces with functions to be modified, and that it is safe to apply the patch on the running system. To do so, the whole system and all its threads should be forced into some fixed and known state (and a call trace) like "refrigerator" mechanism in Linux kernel, when all the threads in the system are forced, by a signal, to switch into the kernel and then caught later on a user space and kernel boundary (or in signal handler) and blocked ("frozen") in this point in code until the procedure is finished. When the threads are in the "refrigerator", they have known call traces and stacks, and the system can guarantee that their execution state will not change and thus will not be corrupted by the code update and disrupted on the threads' return from these functions (FIG. 10).

It is often the case that some user threads are blocked on some resource for a long time and can't be quickly forced into refrigerator (e.g., waiting for a page or semaphore or RPC—a so called UNINTERRUPTABLE_SLEEP task state in Linux kernel). This results in some normal processes already put into refrigerator to be frozen for a long time while waiting for blocked threads to be caught by refrigerator and the whole system to appear unresponsive. Such a long freezing of processes and resulting unresponsiveness of the system can be mitigated by using adaptive freezing. To do so, we initially try to freeze all the processes in the system with tiny timeout and record all the processes that failed to freeze on this attempt. All the processes are unfrozen after the first attempt. At the next step, we try to freeze only the processes that failed to do so on the previous attempt. Only after such hard to freeze processes were finally caught in the refrigerator we start freezing the rest of the system. This approach allows the system to stay responsive while gradually and iteratively putting it to a state suitable for the hot live update to be applied.

For kernel threads, the "refrigerator" mechanism simply has function calls inserted in the source code to the function doing such execution blocking ("freezing") directly. If such a mechanism is not available, then patching of the signal handler should be done first, and then all the threads going through signal handling procedure would be caught manually. While other binary update systems try to scan all thread stacks to verify the safeness of the update (which may never be true due to false positives), this approach is robust and works even if the application does not support the refrigerator mechanism like in Linux.

Figure 10:
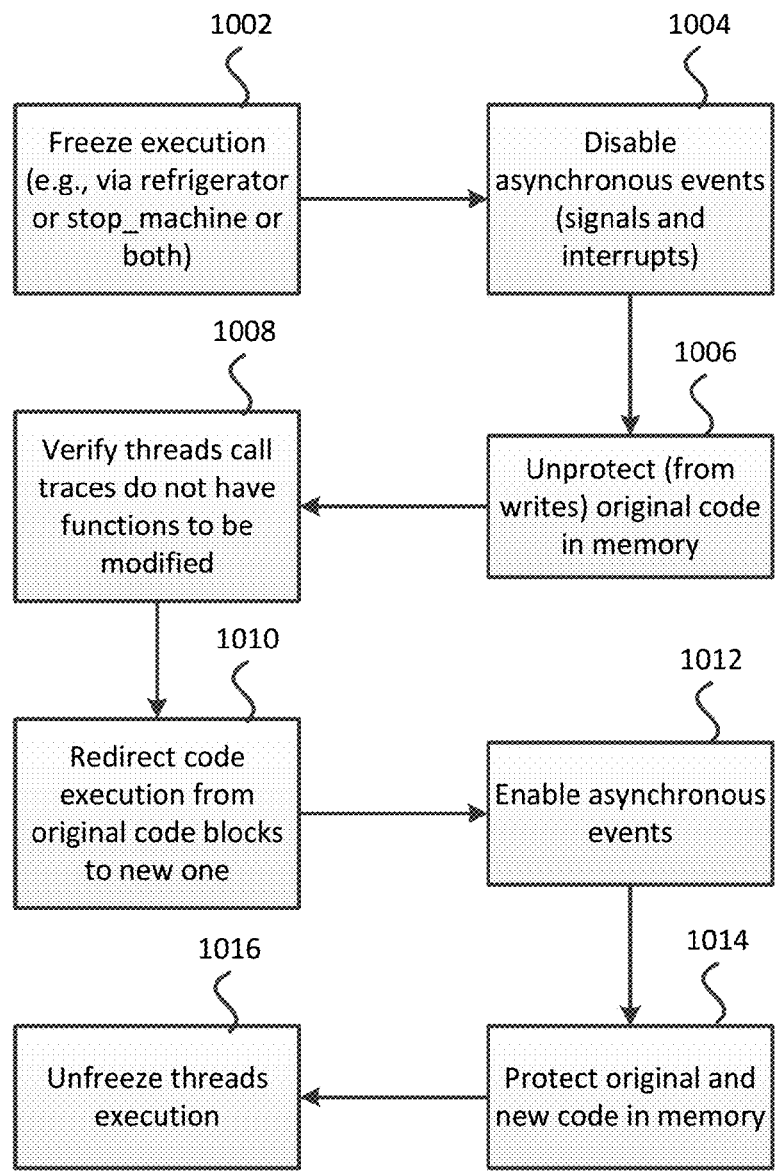
FIG. 10 illustrates an example of stages needed to apply a live update, such as blocking execution threads in some safe context, disabling external events and unprotecting write-protected original code.

Thus, as illustrated in detail in FIG. 10, in step 1002, the system freezes execution (e.g., via refrigerator or stop_machine or both). In step 1004, the system disables asynchronous events (signals and interrupts). In step 1006, the system unprotects (from writes) original code in memory. In step 1008, the system verifies that thread/call traces do not have functions to be modified. In step 1010, the system redirect code execution from original code blocks to new ones. In step 1012, the system enables asynchronous events. In step 1014, the system protects original and new code in memory. In step 1016, the system unfreezes threads execution.

For user-space applications, which normally do not have a "refrigerator" mechanism like in Linux kernel, another approach can be used. Debugging methods, such as tracing, allow freezing the application threads in a state suitable for applying the live update. If the thread is not in a safe context, then it can be traced until its execution reaches a safe point in code. This method can be optimized by tracing the application threads in a more efficient manner, rather then tracing step-by-step each code instruction, e.g., by setting a breakpoint on return back from the functions which are to be updated and which are found right now in thread execution call traces. Thus, upon return from the function, it will be popped out from the stack and the live update system can verify whether the rest of the call stack still has any unsafe to-be-modified functions left.

After all the execution threads are caught in a safe code call traces, the live update system must guarantee that it will not be interrupted during the update procedure by asynchronous events, like interrupts of signals. To do so in case of an OS kernel, the update system must stop the execution on all the CPUs, except the current ones by disabling NMI and conventional interrupts or by shutting them down altogether. Many OS kernels, like Linux, already have mechanisms for doing such a "stop", called stop_machine( ). If it is not the case, all the CPUs can be caught in a CPU idle handler and stopped there with disabled interrupts, until the procedure is over. Note, it is not hard to "update" CPU idle handler first in an atomic manner to inject the code doing a CPU "stop".

For the correct work of the updated code, it might be necessary to link the data generated with it with the rest of the data in the application. An example of this would be Linux kernel _ex_table, or _bug_table, or module symbol tables. Let's consider the _ex_table example for that. The Linux kernel uses CPU faults on access to user data to handle errors. When such an exception happens during kernel trying to access the faulty user memory, the kernel looks up the address of the instruction that triggered a fault in "_ex_table" table, and, if found, switches the execution to the special handler taken from the corresponding table entry. This handler returns an error to the original code trying to access the wrong data (instead of crashing the whole kernel). Since live update code may also need to access user data in such a safe manner, it may contain such "_ex_table" table entries as well.

However, the original kernel code is not aware about such tables loaded by the update system, and will not be able to handle a fault in this way. To fix the problem, the live update system has to patch the original kernel code in places like those performing a lookup over the "_ex_table" entries, by adding a lookup over update "_ex_table" table as well. A similar approach might be used to make the kernel print the correct call traces for the code from the update, by patching the call trace dump code with additional lookups of addresses, verifying they belong to the update, and printing their names (rather that raw addresses).

Another embodiment of the invention is related to data structures modification in the update source code patch. Since data structures may have existing instances in the memory of the running application already, it is not safe just to modify them in the new source code, which would result to wrong data layout and access. Instead, some changes to the original source code patch should be done to handle that. We do not consider a case of data structure element meaning change, since the compiler or any other automatic tool cannot detect it. Removal of the data structure element is easy to detect, however, during code comparison on compiler IR level, and such elements can be preserved for compatibility with existing data structure in memory, though no longer used.

A more difficult case is when additional data elements were added into the data structure in the modified source code. In this case, the existing data structures in memory might not have enough space to accommodate these new elements and they require special "extending". Simple copying of the data structures into the new instances with more space allocated is not an option, since there might be references to the old structures yet somewhere in the memory. Potentially, such references can be found and replaced with new addresses, but it is a difficult task in the general case.

To solve this problem, a number of approaches are possible. The simplest approach would be to create a map of "shadow" objects with additional data structure elements allocated somewhere else. Such a map would maintain a mapping (or translation) of the original data structure address to an address of the "shadow" data with additional data elements. Typically, such a mapping would be 1:1, implying that for a given data structure, there can be one and only one (or none) shadow object, and vice versa. This approach is well known and widely used, e.g., in binary code retranslation techniques, where an original binary code manipulating CPU page tables is retranslated to another "safe" binary code manipulating same logical operations over "shadow" page tables, which might have a slightly different structure. Such a map can be a hash table or a binary tree for fast lookups or any other data structure allowing such an assignment. For all new data elements to be accessed, a lookup of the shadow object by original data structure address must be performed. This requires a use of special access code (macro or function) in the modified code, or making the compiler add such code directly during code generation for those data elements that were determined to be new ones based on IR analysis.

Access to the new data elements using traditional approach with shadow data structure lookup described above can be quite slow though and undesirable in some cases. Part of the problem is that lookup using binary trees has O(log n) complexity, while hash tables can have collisions and unpredictable time of lookup operation. One embodiment of the invention is a method of assigning an extension to the data structure with new data elements that can be looked up in a constant time. This can be achieved in a number of ways described below.

Figure 6:
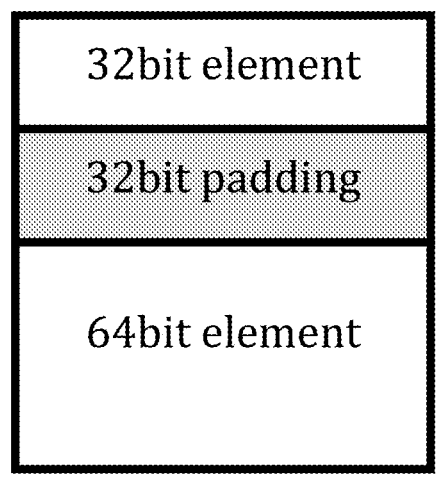
FIG. 6 illustrates a method to find unused bytes in data structures due to natural data elements alignment performed by compilers and using these bytes for storing a pointer to a shadow data structure, to extend an existing data structure.

The most "hacking" approach would be to find unused holes in the data structure inserted by the complier to perform a natural alignment of the data elements inside it, as illustrated, for example, in FIG. 6. Thus, 64-bit data types are always aligned on 64-bit boundary in 64-bit code by default, which means that if it is preceded by a 32-bit data element, the compiler will add another hidden 32-bit padding before the 64-bit element. These padding spaces can be used to gather enough unused bytes for the pointer to the shadow data structure, or to store a smaller bytes index to some intermediate array with pointers to them.

Figure 7:
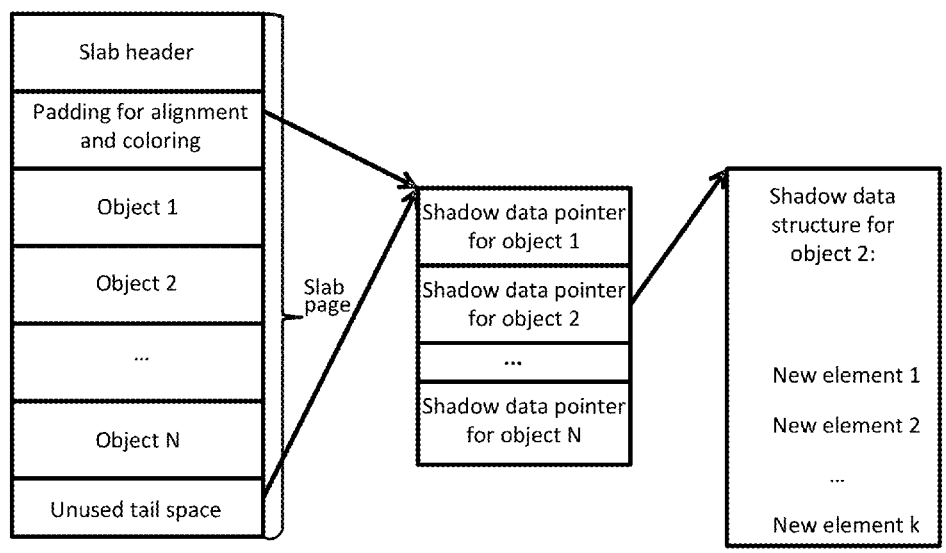
FIG. 7 illustrates a method to find unused bytes left by Linux slab memory allocator to store a pointer to shadow data structures corresponding to user objects residing in that slab page.

Memory allocator bytes is another place where free bytes can be found and used for storing a pointer to the shadow data structure. Thus, in the Linux kernel, for most object allocations, a slab memory allocator is used. This allocator puts its header at the beginning of each slab page (a slab page is typically a single memory page), then has some padding for alignment and cache line "coloring", a number of user objects and possible unused space at the tail of the page as no more objects fit as a whole there anymore without crossing the page boundary, as illustrated in FIG. 7. Due to the padding before the objects and the unused space at the end of the slab, it is very likely to have a plenty of unused bytes there, which can be used for storing a pointer to the array of shadow data structure pointers, one per each object on the slab page. In fact, our experiments demonstrated that this method works reliably for 14 most used slab caches in the Linux kernel that we had to extend.

A similar approach would be to find the unused bytes in the Linux kernel structure called "page" that is not used at full, when the page is managed by the slab allocator. Thus, Redhat Enterprise Linux 6 kernels have a "mapping" field in the "struct page" structure that is not used when the page is under slab allocator, and this field can be used to store a pointer to the array of shadow data structure pointers.

Figure 8:
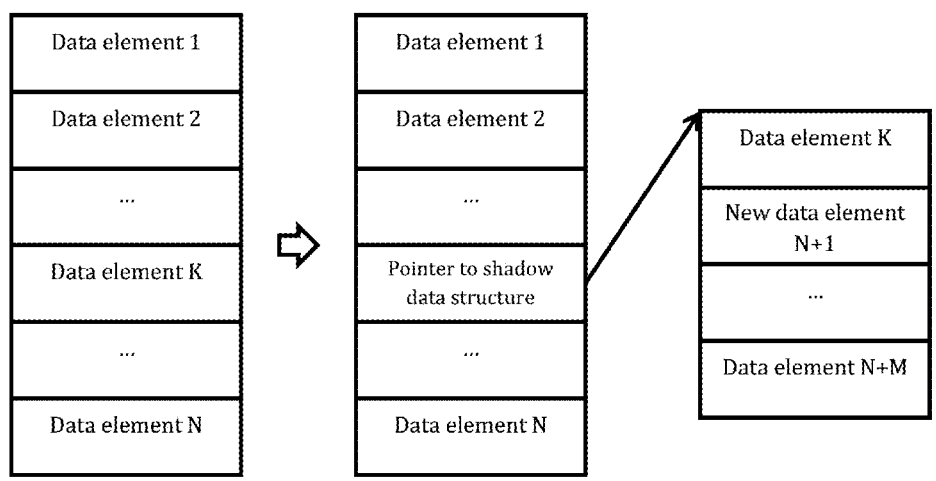
FIG. 8 illustrates a generic method of extending any data structure by storing a pointer to its shadow data structure with new additional data elements by means of moving some of data structure element into shadow data structure and storing a pointer to a shadow instead of that element.

An embodiment of the invention that allows to extend the data structure by associating with it a shadow data structure (with the new data elements) without knowing any details about the memory allocator used, is a method when some existing data element from the existing data structure instance is moved to the shadow data structure and a pointer to the shadow data structure is placed instead of that element, as illustrated in FIG. 8. Obviously it is quite possible, since the code accessing that data element K can be replaced by the live update system with a code accessing shadow data structure instead. Such an approach guarantees fast access to the new data elements without a need to create object shadow mappings. This approach also allows creating multiple data structure extensions, by adding more and more shadow data structures (or by reallocating to the bigger one) and replacing some of the existing data elements with pointers to them, which might be helpful for incremental update procedures.

Figure 9:
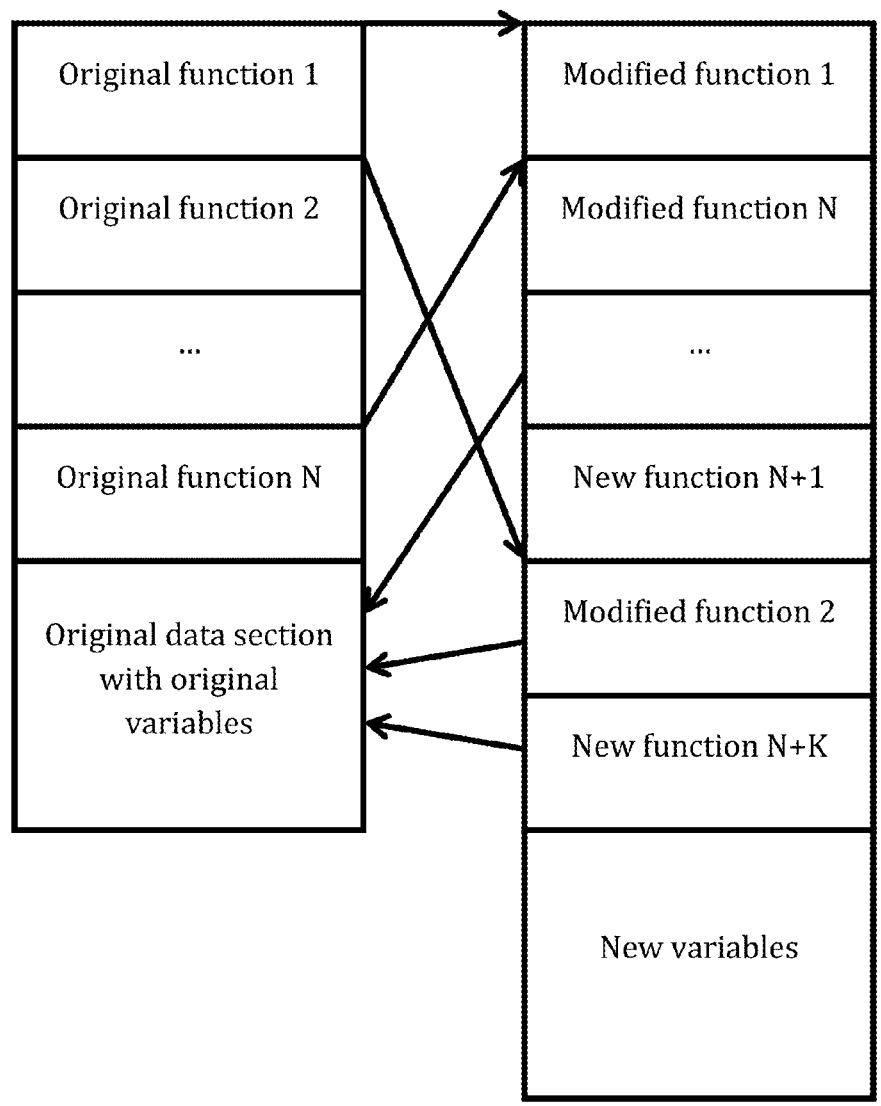
FIG. 9 illustrates a method of creating and applying a live update with the full modified program binary loaded and simplified linking of original and modified functions and variables across those binaries.

Another embodiment of the invention is preparing live updates, when the code is analyzed in the IR (assembler) form, to match the code functions (blocks) that exist in both original and modified version (e.g., by comparing compilation unit and a function name), and information about these matches is saved. Later, to update the system, the new modified binary code without any update system related changes is loaded into memory of the running system, and jumps from the old original code functions to the new modified functions are inserted according to matching information collected during the analysis stage, as illustrated in FIG. 9. New functions existing in the modified code only do not require such jumps from the old code, since they are referred to from the new code only. Old functions that no longer exist in the new code do not require such patching, since the new code does not reference them and does not need to call them.

Such a method allows redirecting all the execution, which occasionally gets into old function versions (e.g., by following a pointer saved in the existing variables) to their new counterparts. Such an approach, though, would require more memory for the whole new binary code to be loaded regardless of the real code and functionality changes. Additionally, modified code must be linked correctly with original variables data section from the original binary, which is quite easy by use of linker script that allows virtual binding of data section to arbitrary address during code linking stage, so data section address can be adjusted right in the modified object file before loading it into memory by means of conventional tools. New variables generated in the modified object file should still be loaded with its section into memory and modified code should refer to it using the correct addresses (and thus may require standard relocation procedure).

Figure 11:
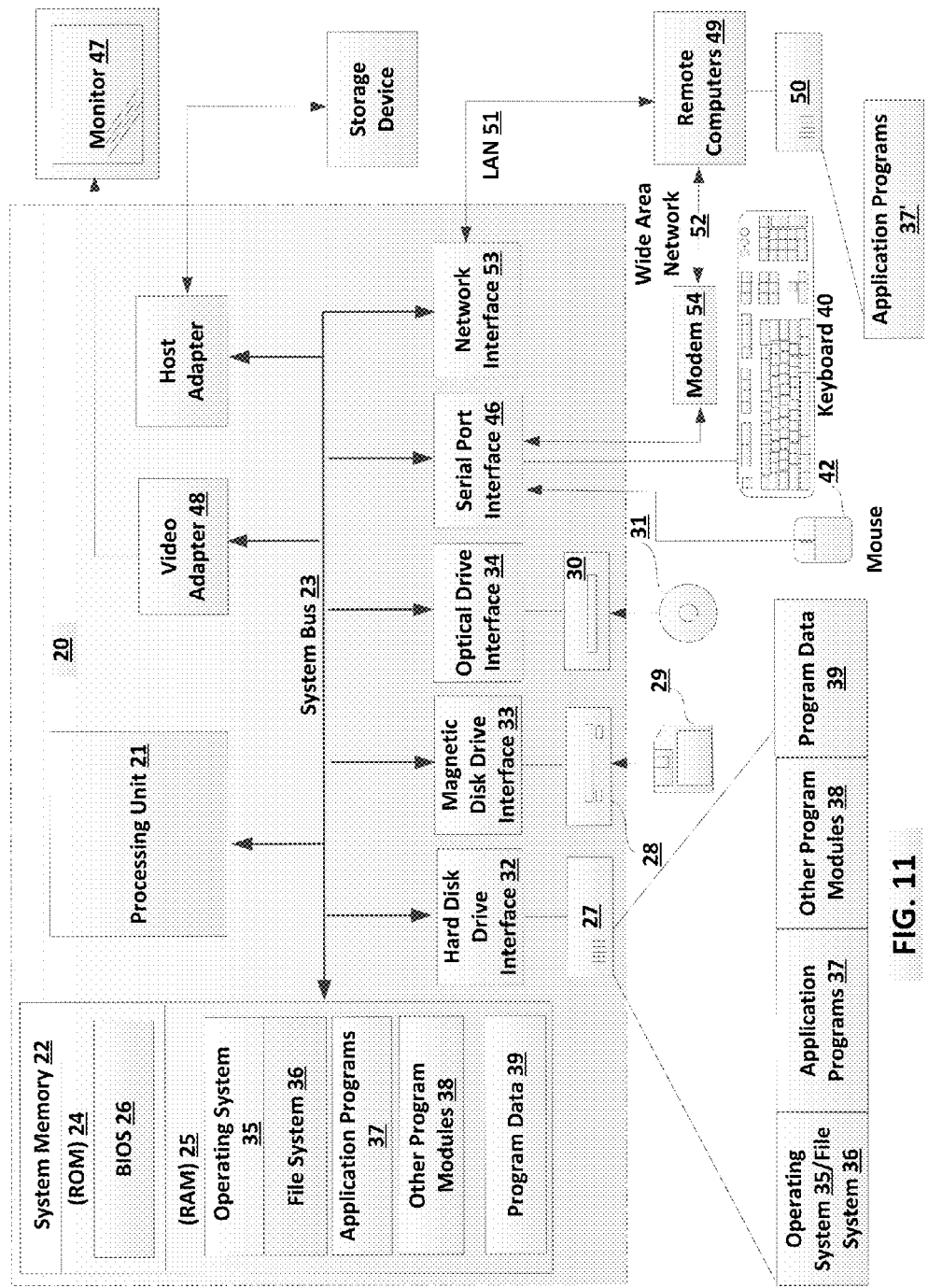
FIG. 11 illustrates an exemplary computer system on which the invention may be implemented.

With reference to FIG. 11, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows™ 2000). The computer 20 includes a file system 36 associated with or included within the operating system 35, such as the Windows NT™ File System (NTFS), Third Extended file system (ext3), Hierarchical file server (HFS), Z file system (ZFS), Global file system (GFS), or Oracle cluster file system (OCFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated in FIG. 11. The logical connections depicted in FIG. 11 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations and alternative embodiments thereof may be made within the scope and spirit of the present invention. The invention is further defined by the following claims.

REFERENCES

U.S. Pat. No. 8,612,951 B2 Method of determining which computer program functions are changed by an arbitrary source code modification (Ksplice)

US 20100269105 A1 METHOD OF DETERMINING WHICH COMPUTER PROGRAM FUNCTIONS ARE CHANGED BY AN ARBITRARY SOURCE CODE MODIFICATION

U.S. Pat. No. 8,261,247 B2 Method of modifying code of a running computer program based on symbol values discovered from comparison of running code to corresponding object code U.S. Pat. No. 8,607,208 B1 System and methods for object code hot updates

What is claimed is:

1. A method for generation of a live update of an application or an OS kernel, the method comprising:
    compiling original source code into a first intermediate representation (IR) code;
    compiling modified source code into a second IR code;
    analyzing and comparing the first IR code and the second IR code to identify variables and functions that were changed, added or deleted;
    generating a part of a final IR code with all original variables and original functions from the original IR code;
    generating an additional part of the final IR code with new code for modified portions of the changed functions, added functions and variables, and compiling the modified portions into separate code/data sections, wherein modified functions are considered to be changed in function in full rather than detecting narrow code portions and whole modified function code is generated in the additional part of the final IR code;
    compiling a new object code and a final executable binary based on the final IR code, wherein the final executable object code includes the original code and data from an original application binary, and including a live update code and data from the additional part of the final IR code, and
    wherein the live update code and data are correctly referring to the original code and data where needed via standard object code relocation information with references to original code or variables in the same the or by names or by fixed absolute addresses, and the relocation information is generated to reference code and data in other system components, and is used during the live update of the system.

2. The method of claim 1, wherein the first, second and final IR code is compiler-specific.

3. The method of claim 1, wherein the IR code is assembler generated by the compiler.

4. The method of claim 3, wherein debug information in an assembler listing is filtered out or ignored for the code comparison.

5. The method of claim 1, wherein, during the analyzing step, functions and variables that have non-functional chances due to environmental differences are considered to be unchanged.

6. The method of claim 5, wherein the non-functional environmental changes are source code line numbers or source code path or compilation date differences which are used in the source code directly or indirectly for purposes not affecting a logic of the application.

7. The method of claim 1, wherein after the compilation of the final IR code into object code binary, the original code is stripped and a live update code and variables are left in the final object code, and wherein the final object code used to update a live system.

* * * * *